United States Patent
Ni et al.

(10) Patent No.: US 12,207,665 B2
(45) Date of Patent: Jan. 28, 2025

(54) PREPARATION METHOD OF LOW-LACTOSE DAIRY PRODUCT RICH IN HONEY POMELO FIBER

(71) Applicant: JIMEI UNIVERSITY, Xiamen (CN)

(72) Inventors: Hui Ni, Xiamen (CN); Shidi Lin, Xiamen (CN); Lijun Li, Xiamen (CN); Xinru Liu, Xiamen (CN); Xialei Liu, Xiamen (CN); Yuanfan Yang, Xiamen (CN); Mingjing Zheng, Xiamen (CN)

(73) Assignee: JIMEI UNIVERSITY, Xiamen (CN)

( * ) Notice: Subject to any disclaimer, the term of this patent is extended or adjusted under 35 U.S.C. 154(b) by 0 days.

(21) Appl. No.: 18/697,005

(22) PCT Filed: Mar. 31, 2022

(86) PCT No.: PCT/CN2022/084454
§ 371 (c)(1),
(2) Date: Mar. 29, 2024

(87) PCT Pub. No.: WO2023/056736
PCT Pub. Date: Apr. 13, 2023

(65) Prior Publication Data
US 2024/0334944 A1    Oct. 10, 2024

(30) Foreign Application Priority Data

Oct. 4, 2021    (CN) .......................... 202111167358.X

(51) Int. Cl.
*A23L 19/00*    (2016.01)
*A23C 1/08*    (2006.01)
(Continued)

(52) U.S. Cl.
CPC ................ *A23C 9/133* (2013.01); *A23C 1/08* (2013.01); *A23C 9/1232* (2013.01); *A23C 9/1307* (2013.01)

(58) Field of Classification Search
CPC ......... A23C 9/133; A23C 1/08; A23C 9/1232; A23C 9/1307
(Continued)

(56) References Cited

U.S. PATENT DOCUMENTS 5,616,355 A * 4/1997 Haast ...................... A23L 33/21
426/384

FOREIGN PATENT DOCUMENTS

CN    105941627 A    9/2016
CN    108902309 A    11/2018
(Continued)

OTHER PUBLICATIONS

GB 5009 .5—2016,National Standard for Food Safety: Determination of Protein in Foods, 2016, pp. 1-7, State Food and Drug Administration of China.

*Primary Examiner* — Brent T O'Hern
(74) *Attorney, Agent, or Firm* — Bayramoglu Law Offices LLC

(57) ABSTRACT

A preparation method of a low-lactose dairy product rich in honey pomelo fiber includes the following steps: washing, cutting and debitterizing peels of honey pomelos to obtain honey pomelo fiber pieces; sterilizing and cooling milk solution, performing the first-round fermentation by inoculating lactic acid bacteria, centrifuging the fermented milk after curding, collecting precipitates, adding water to the precipitates, and performing homogenizing treatment to obtain the first-round fermented milk; mixing the honey pomelo fiber pieces with the first-round fermented milk, and performing the second-round fermentation by inoculating the lactic acid bacteria; or performing the second-round fermentation by inoculating the first-round fermented milk with the lactic acid bacteria, and then mixing the second-round fermented milk with the honey pomelo fiber pieces; and prefreezing the treated honey pomelo fiber pieces
(Continued)

treated in the previous step and then performing vacuum freeze-drying to obtain low-lactose dairy products rich in honey pomelo fiber.

5 Claims, 2 Drawing Sheets

(51) Int. Cl.
*A23C 9/123* (2006.01)
*A23C 9/13* (2006.01)
*A23C 9/133* (2006.01)

(58) Field of Classification Search
USPC .......................................................... 426/43
See application file for complete search history.

(56) References Cited

FOREIGN PATENT DOCUMENTS

| | | |
|---|---|---|
| CN | 110999968 A | 4/2020 |
| CN | 111296846 A | 6/2020 |
| CN | 112568290 A | 3/2021 |
| CN | 112715666 A | 4/2021 |
| CN | 113367194 A | 9/2021 |
| CN | 113854354 A | 12/2021 |

* cited by examiner

PREPARATION METHOD OF LOW-LACTOSE DAIRY PRODUCT RICH IN HONEY POMELO FIBER

CROSS REFERENCE TO THE RELATED APPLICATIONS

This application is the national phase entry of International Application No. PCT/CN2022/084454, filed on Mar. 31, 2022, which is based upon and claims priority to Chinese Patent Application No. 202111167358.X, filed on Oct. 4, 2021, the entire contents of which are incorporated herein by reference.

TECHNICAL FIELD

The present invention relates to the technical field of dairy products, and in particular to a preparation method of a low-lactose dairy product rich in honey pomelo fiber.

BACKGROUND

Dairy products are rich in a variety of functional proteins and small molecular active substances, which are an important source of high-quality protein for people of all ages. The dairy products often contain a certain amount of lactose, so it is easy to cause problems of lactose intolerance and intestinal allergies. The fermentation of dairy products can decompose part of lactose into lactic acid, but the fermented dairy products still contain 2.5-5.0% of lactose. Therefore, there is still a certain risk for lactose intolerant accident by using the traditional fermentation processes. Moreover, traditional fermented dairy products are liquid or crumbly solid granules (such as freeze-dried yogurt blocks) that are not easy to preserve and transport.

In recent years, due to the change of working and living environment, dietary fiber is becoming more and more important in people's daily life. However, the traditional fermented dairy products are short of dietary fiber.

In conclusion, the traditional fermented dairy products have the problems that the lactose content is higher than the lactose intolerance threshold, high-quality cellulose is deficient, and the storage and transportation cost is high.

SUMMARY

In order to solve the above-mentioned problems, the present invention provides a preparation method of a low-lactose dairy product rich in honey pomelo fiber, which can solve the problems of lack of high-quality fiber and high lactose content in dairy products, and can satisfy the nutritional requirements of lactose intolerant people.

To achieve the aforesaid purpose, an embodiment of the present invention provides a preparation method of a low-lactose dairy product rich in honey pomelo fiber, including the following steps:

(1) peels of honey pomelos are washed, cut and debitterized to obtain honey pomelo fiber pieces;

(2) milk solution is sterilized and cooled, and submitted to the first-round fermentation by inoculating lactic acid bacteria until the lactose content is not reduced anymore; after curding, the fermented milk is centrifuged to collect the precipitates; water is added to the precipitates to make the pH value over 5.0, followed by homogenizing treatment, resulting in the first-round fermented milk;

(3) the honey pomelo fiber pieces are mixed with the first-round fermented milk, and the second-round fermentation is performed by inoculating the lactic acid bacteria until the lactose content is lower than 0.04%; or the second-round fermentation is performed by inoculating the first-round fermented milk with the lactic acid bacteria until the lactose content is lower than 0.04%, and then the second-round fermented milk is mixed with the honey pomelo fiber pieces;

(4) the honey pomelo fiber pieces treated in step (3) are prefreezed and then vacuum freeze-drying is performed to obtain low-lactose dairy products rich in honey pomelo fiber.

According to the preparation method of a low-lactose dairy product rich in honey pomelo fiber of the embodiment of the present invention, by adopting the second-round fermentation method, the residual lactose and protein in the fermented milk are further hydrolyzed on the basis of the first-round fermentation, so that the lactose content is further reduced, which solves the problem of incomplete lactose fermentation caused by low pH value in the first-round fermentation process; adding high-quality dietary fiber to the fermented milk solves the problem of lacking dietary fiber in traditional fermented dairy products; wherein the dietary fiber added is blocky, which solves the problems of easy damage and spoilage of liquid and solid granular dairy products in the transportation and storage process. Therefore, the rich dietary fiber resource in honey pomelos is fully used to make up for the deficiency of fiber in dairy processing, and eliminate the risk of lactose intolerance; the low-lactose dairy product prepared plays an important role in intestinal health and protein balance of the elderly, infants and people who sit in office for a long time, and features a broad market prospect.

Moreover, according to the preparation method of a low-lactose dairy product rich in honey pomelo fiber provided in the above-mentioned embodiment of the present invention, the method can further include the following additional technical features:

Optionally, in step (2), the lactic acid bacteria include one or more of *Lactobacillus plantarum, Lactobacillus acidophilus, Lactobacillus bulgaricus, Streptococcus thermophilus, Pediococcus pentosaceus* and *Bifidobacterium.*

Optionally, in step (2), the milk solution is fresh milk, pasteurized milk or reconstituted milk made from milk powder.

Optionally, in step (3), a mixing method for the honey pomelo fiber pieces and the fermented milk includes vacuum infiltration, normal-pressure infiltration or high-pressure infiltration.

Optionally, in step (4), the honey pomelo fiber pieces are vacuum freeze-dried to a moisture content in dairy products of lower than 10%.

Optionally, in step (1), the peel fiber is debitterized by hot water blanching, alcohol extraction or enzyme hydrolysis.

The additional aspects and advantages of the present invention will be given in part in the following description, and part of the aspects and advantages will become apparent from the following description or be understood through the practice of the present invention.

DETAILED DESCRIPTION OF THE EMBODIMENTS

The technical solutions of the present invention will be described below through the specific embodiments. It should be understood that one or more method steps mentioned in the present invention does not preclude the existence of other method steps preceding and following the combined steps or the insertion of other method steps between these explicitly mentioned steps; it should also be understood that these embodiments are used only to describe the present invention, rather than to limit the scope of the present invention. Moreover, unless otherwise stated, the number of each method step is only a convenient tool for identifying each method step, rather than limiting the sequence of each method step or limiting the implementable scope of the present invention, and the change or adjustment of the relative relation therein should also be considered as the implementable scope of the present invention, provided that the technical content is not substantially changed.

In order to better understand the above-mentioned technical solutions, the exemplary embodiments of the present invention will be described below in detail. Although the exemplary embodiments of the present invention are shown, it should be understood that the present invention can be realized in various forms, rather than being limited by the embodiments elaborated herein. On the contrary, these embodiments are provided in order to more thoroughly understand the present invention and completely convey the scope of the present invention to those skilled in the art.

The test materials used in the present invention are common commercially available products.

It should be noted that:

A HPLC method is used for determination of the lactose content, GB5009.5-2016 is used for determination of the protein content, a normal-pressure drying method is used for determination of the moisture content, and a texture analyzer method and sensory evaluation method are used for determination of the texture.

Figure 1:
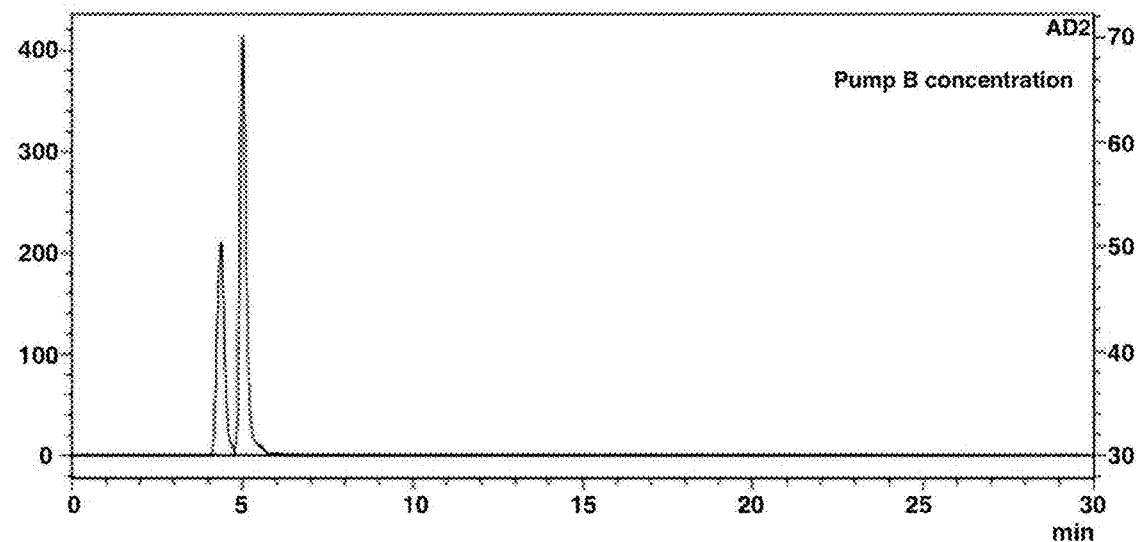
FIG. 1 is a HPLC chromatogram of lactose determined according to the examples of the present invention.
Figure 2:
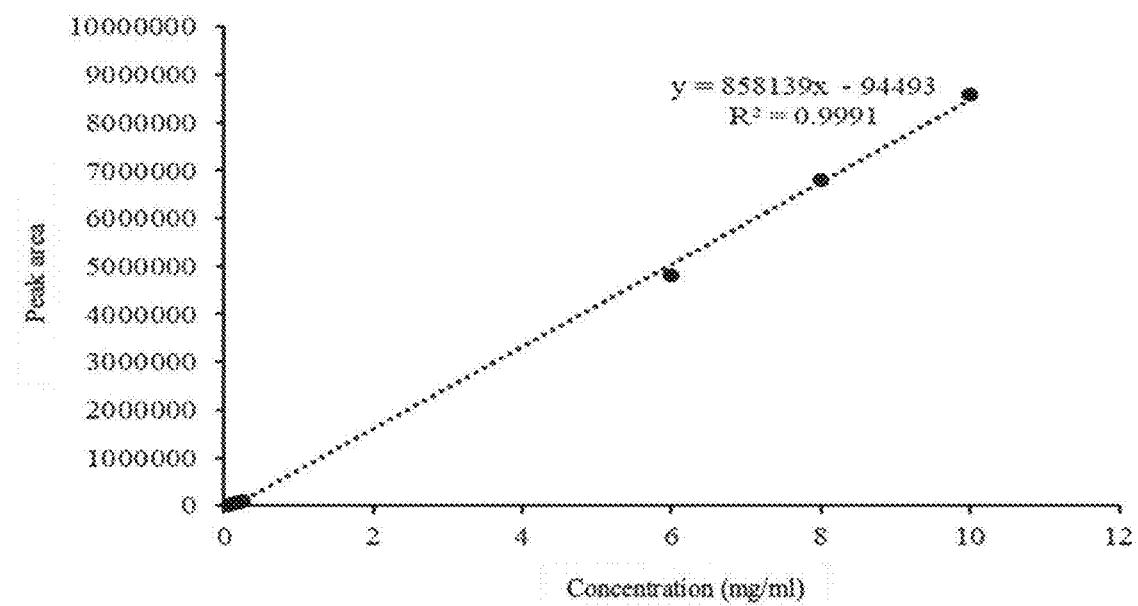
FIG. 2 is a standard curve of lactose determined by HPLC according to the examples of the present invention.

Determination of lactose content: As shown in FIG. 1, the products are crushed and dissolved in a certain proportion of water, and centrifuged at 5,000 r/min for 15 min, and supernatant is discarded; the milk solution is washed by warm water (25° C.) once and washed by cold water twice, and the milk solution is centrifuged and precipitates are taken after the milk solution is washed each time; the last casein precipitate sample is taken and subjected to vacuum freeze-drying to obtain crude casein. A high performance liquid chromatography (HPLC) is selected to test the crude casein; chromatographic column: amino column (4.5*250 mm, Ireland); mobile phase: acetonitrile:water=70:30; flow velocity: 1 ml/min; column temperature: 40° C.; sample size: 10 µL; differential refraction detector condition: 33-37° C.; evaporative light-scattering detector condition: drift tube temperature of 40° C.; impactor: OFF. A content percentage of the lactose can be calculated according to the standard curve Y=858139X−94493 ($R^2$=0.9991) in FIG. 2 and formula (1). If the lactose concentration is low, the sample needs to be concentrated during sample preparation: 2.500 g (accurate to 0.1 mg) of casein precipitates is accurately weighed in a 25 ml volumetric flask, and 18.75 ml of 50° C. water is added for dissolution; the solution is vibrated in an ultrasonic oscillator for 10 min, and a volume is set to the scale by adding acetonitrile; the solution is centrifuged at 5,000 rpm in a high-speed centrifuge for 10 min, and supernatant is taken and filtrated by double-layer filter paper. 10 ml of filtrate is taken and concentrated by rotary evaporation at 40° C., the concentrated filtrate is redissolved in 2 ml of acetonitrile and filtrated by a 0.22 µm nylon membrane, and the resulting filtrate is used for chromatographic analysis.

$$X/\% = \frac{\rho \times v}{m \times 1000} \times 100 \qquad (1)$$

where X is a content of lactose in the sample, in %; ρ is a mass concentration of lactose in the sample calculated by the standard curve, in mg/mL; V is a constant volume of the sample, in mL; and m is a mass of the sample, in g.

Determination of protein content: GB5009.5-2016 was used for testing.

Determination of moisture content: 1 g±0.02 g of sample is weighed and tested in a MB25 moisture analyzer (Ohaus) at 160° C., and the obtained value is the measured moisture content.

Determination of texture: A TA. Touch texture analyzer (BosinTech) and a TA/0.5S-spherical probe are used for testing. The pre-testing speed is 1.00 mm/s, the testing speed is 0.5 mm/s, and the post-testing speed is 0.5 mm/s; the test type is downward pressing, the target pattern is displacement, and the target value is 3.000 mm; the trigger point type is force, and the starting point value is 5.000 gf. The maximum pressure peak in the coordinate graph represents hardness, i.e., the maximum force required for sample fracture, in gf; the first obvious pressure peak in the downward pressing process represents crispness, in gf.

Sensory evaluation: According to the sensory evaluation criteria, personnel with sensitive taste and no bad habits are randomly selected to form an evaluation group, and a blind sample evaluation method is adopted to score the product. The sensory evaluation and scoring criteria are shown in Table 1.

TABLE 1

Sensory Evaluation Scoring Criteria

| Description of Quality Characteristics | Score |
| --- | --- |
| 1. Flexible or hard in texture, too soft or too hard in taste | 0-1 |
| 2. Relatively flexible or relatively hard in texture, softer or harder in taste | 1-3 |
| 3. Crispy in texture, soft or hard in taste | 3-6 |
| 4. Crispy and tender in texture, moderately soft and hard in taste | 6-8 |
| 5. Crispy and tender in texture, moderately hard in taste | 8-10 |

The present invention will be described below by reference to specific embodiments. It should be noted that these embodiments are only descriptive and are not intended to limit the present invention in any way.

Example 1

*Lactobacillus bulgaricus*-Fermented Low-Lactose Dairy Products Rich in Honey Pomelo Fiber:

Preparation of honey pomelo fiber pieces: Young Guanxi honey pomelos as a raw material were washed and cut into suitable pieces, and the honey pomelo pieces were immersed in an aqueous solution containing 5% of sodium chloride and 0.5% of sodium bicarbonate, heated at 90° C. for 5 min, and filtrated to remove the aqueous solution. The honey pomelo fiber pieces were taken out, repeatedly heated and extracted in the aqueous solution containing 5% of sodium chloride and 0.5% of sodium bicarbonate at 90° C. three times to obtain honey pomelo fiber pieces.

Preparation of the first-round fermented milk: Fresh milk (with a lactose content of 4.8%) as a raw material was sterilized and cooled, inoculated with 4% of *Lactobacillus bulgaricus* and fermented at 40° C. until the lactose content was not reduced anymore, and the fermented milk was centrifuged (at 5,000 r/min for 15 min) after curding. Supernatant was removed, and precipitates were collected. Water was added until the pH value was greater than 5.0, and homogenizing treatment was performed to obtain the first-round fermented milk.

The first-round fermented milk was mixed with the honey pomelo fiber pieces, and 4% of *Lactobacillus bulgaricus* was inoculated after the honey pomelo fiber pieces were completely immersed in the first-round fermented milk. The mixture was mixed evenly and degassed in a vacuum suction tank at a vacuum degree of −0.1 MPa for 40 min, maintained for 5 min after the vacuum was released, so that the milk solution was infiltrated into the honey pomelo fiber pieces, and the second-round fermentation was performed at 40° C. until the lactose content was not reduced anymore. The fermented honey pomelo fiber pieces were taken out, prefrozen and vacuum freeze-dried to obtain low-lactose dairy products rich in honey pomelo fiber.

The low-lactose dairy products obtained in the example were tested, wherein the moisture content was 10.95%, the hardness was 3,352.37 gf and the crispness was 2,279.84 gf. The low-lactose dairy products were crispy and tender and moderately hard; the sensory evaluation score was 8-10 points, and the lactose content was 50 μg/ml lower than limit of detection (LOD) (lower than 0.040%).

Example 2

*Lactobacillus acidophilus*-Fermented Low-Lactose Dairy Products Rich in Honey Pomelo Fiber:

Preparation of honey pomelo fiber pieces: Young Guanxi honey pomelos as a raw material were washed and cut into suitable pieces, and the honey pomelo pieces were immersed in an aqueous solution (pH=4.0) containing 0.3 wt % naringinase, heated at 60° C. for 60 min, and filtrated to remove the aqueous solution to obtain honey pomelo fiber pieces.

Preparation of the first-round fermented milk: Reconstituted milk (with a lactose content of 4.6%) as a raw material was sterilized and cooled, inoculated with 5% of *Lactobacillus acidophilus* and fermented at 35° C. until the lactose content was not reduced anymore, and the fermented milk was centrifuged (at 5,000 r/min for 15 min) after curding. Supernatant was removed, and precipitates were collected. Water was added until the pH value was greater than 5.0, and homogenizing treatment was performed to obtain the first-round fermented milk.

The first-round fermented milk was mixed with the honey pomelo fiber pieces, and 5% of *Lactobacillus acidophilus* was inoculated after the honey pomelo fiber pieces were completely immersed in the first-round fermented milk. The mixture was mixed evenly and immersed at a normal pressure for 60 min, so that the milk solution was infiltrated into the honey pomelo fiber pieces, and the second-round fermentation was performed at 35° C.' until the lactose content was not reduced anymore. The fermented honey pomelo fiber pieces were taken out, prefrozen and vacuum freeze-dried to obtain low-lactose dairy products rich in honey pomelo fiber.

The low-lactose dairy products obtained in the example were tested, wherein the moisture content was 10.32%, the hardness was 3,835.50 gf and the crispness was 2,220.40 gf. The low-lactose dairy products were crispy and tender and moderately hard; the sensory evaluation score was 8-10 points, and the lactose content was 50 μg/ml lower than LOD (lower than 0.040%).

Example 3

Complex Cactobacillus *Thermophilus* and *Lactobacillus plantarum*-Fermented Low-Lactose Dairy Products Rich in Honey Pomelo Fiber:

Preparation of honey pomelo fiber pieces: Young Guanxi honey pomelos as a raw material were washed and cut into suitable pieces, and the honey pomelo pieces were immersed in 90% ethanol aqueous solution, heated at 65° C. for 3 h, and filtrated to remove the ethanol aqueous solution. The honey pomelo pieces were washed by pure water three times to remove ethanol to obtain honey pomelo fiber pieces.

Preparation of the first-round fermented milk: Fresh milk (with a lactose content of 4.8%) as a raw material was sterilized and cooled, inoculated with 3% of complex strain containing Cactobacillus *thermophilus* and *Lactobacillus plantarum* and fermented at 42° C. until the lactose content was not reduced anymore, and the fermented milk was centrifuged (at 5,000 r/min for 15 min) after curding. Supernatant was removed, and precipitates were collected. Water was added until the pH value was greater than 5.0, and homogenizing treatment was performed to obtain the first-round fermented milk.

The first-round fermented milk was inoculated with 3% of complex strain containing Cactobacillus *thermophilus* and *Lactobacillus plantarum*, and the second-round fermentation was performed at 42° C. until the lactose content was not reduced anymore. The second-round fermented milk was mixed with the honey pomelo fiber pieces evenly, and the mixture was maintained at 0.2 MPa in a pressure tank for 40 min, so that the milk solution was infiltrated into the honey pomelo fiber pieces. The fermented honey pomelo fiber pieces were taken out, prefrozen and vacuum freeze-dried to obtain low-lactose dairy products rich in honey pomelo fiber.

The low-lactose dairy products obtained in the example were tested, wherein the moisture content was 9.85%, the hardness was 3,464.11 gf and the crispness was 2,113.64 gf. The low-lactose dairy products were crispy and tender and moderately hard; the sensory evaluation score was 8-10 points, and the lactose content was 50 μg/ml lower than LOD (lower than 0.040%).

Comparative Example 1

No Second-Round Fermentation was Performed.

Preparation of honey pomelo fiber pieces: Peels of mature Guanxi honey pomelos as a raw material were washed and cut into suitable pieces, and the honey pomelo pieces were immersed in an aqueous solution containing 0.6% of B-cyclodextrine, heated at 50° C. for 60 min, and filtrated to remove the aqueous solution to obtain honey pomelo fiber pieces.

Preparation of the first-round fermented milk: Reconstituted milk (with a lactose content of 4.6%) as a raw material was sterilized and cooled, inoculated with 5% of *Lactoba-*

*cillus thermophilus* and fermented at 35° C. until the lactose content was not reduced anymore, and the fermented milk was centrifuged after curding. Supernatant was removed, and precipitates were collected. Water was added until the pH value was greater than 5.0, and homogenizing treatment was performed to obtain the first-round fermented milk.

The first-round fermented milk was mixed with the honey pomelo fiber pieces, and the mixture was degassed in a vacuum suction tank at a vacuum degree of −0.1 MPa for 40 min after the honey pomelo fiber pieces were completely immersed in the first-round fermented milk, and maintained for 5 min after the vacuum was released, so that the milk solution was infiltrated into the honey pomelo fiber pieces. The honey pomelo fiber pieces were taken out, prefrozen and vacuum freeze-dried to obtain fermented dairy products rich in honey pomelo fiber.

The dairy products obtained in the comparative example were tested, wherein the moisture content was 9.53%, the hardness was 3,649.81 gf and the crispness was 2, 167.02 gf. The dairy products were crispy and tender and moderately hard; the sensory evaluation score was 8-10 points, and the lactose content was 2.4%.

In conclusion, according to the examples of the present invention, the bitterness in the honey pomelo fiber pieces is effectively removed by the debitterizing treatment, and the honey pomelo dietary fiber blocks are prepared; the lactose content is reduced to less than 0.04% by the second-round fermentation with lactic acid bacteria. The fermented milk is infiltrated into the honey pomelo fiber pieces by the infiltration technology; the probiotics and nutritional components in the product are retained to the maximum extent by the vacuum freeze-drying technology, and the crispy taste is maintained; the fiber blocks is instead of powder or silk fiber to prevent the product from breaking during transportation and storage. Therefore, the low-lactose dairy product rich in honey pomelo fiber of the present invention contains high-quality casein, dietary fiber and various probiotics, has the physiological functions of regulating a blood glucose level and preventing cardiovascular diseases, causes no lactose intolerance, and is convenient for transportation and storage.

In the description of the specification, the description of reference terms "one embodiment", "some embodiments", "examples", "specific example" or "some examples" is intended to means that the specific characteristics, structures, materials or features described in combination with that embodiment or example are contained in at least one embodiment or example of the present invention. In the specification, the indicative representations of the above-mentioned terms should not be understood as necessarily referring to the same embodiment or example. Moreover, the specific characteristics, structures, materials or features described may be combined in a suitable way in any one or more embodiments or examples. In addition, those skilled in the art may connect and combine different embodiments or examples described in the specification.

Although the embodiments of the present invention have been shown and described above, it can be understood that the above-mentioned embodiments are exemplary and cannot be understood as a limitation to the present invention, and those of ordinary skill in the art may make changes, modifications, substitutions and transformations to the above-mentioned embodiments within the scope of the present invention.

What is claimed is:

1. A preparation method of a low-lactose dairy product rich in honey pomelo fiber, comprising the following steps:
    (1) washing, cutting and debitterizing peels of honey pomelos to obtain honey pomelo fiber pieces, and freezing the honey pomelo fiber pieces;
    (2) sterilizing and cooling a milk solution, and performing a first-round of fermentation on the milk solution by inoculating lactic acid bacteria until a lactose content is not reduced anymore; curding and centrifuging the milk solution, then collecting precipitates; adding water to the precipitates to make the pH value over 5.0, followed by a homogenizing treatment to obtain a first-round fermented milk;
    (3) mixing the honey pomelo fiber pieces with the first-round fermented milk, performing a second-round fermentation on the first-round fermented milk and honey pomelo fiber pieces mixture by inoculating lactic acid bacteria until the lactose content is lower than 0.04% wt/vol;
    or performing a second-round fermentation on the first-round fermented milk by inoculating the first-round fermented milk with lactic acid bacteria until the lactose content is lower than 0.04% wt/vol to obtain a second-round fermented milk, and then mixing the second-round fermented milk with the honey pomelo fiber pieces;
        wherein a mixing method for mixing the honey pomelo fiber pieces with the first-round fermented milk comprises infiltration; and
    (4) performing vacuum freeze-drying to obtain dairy products with a lactose content lower than 0.04% wt/vol and having honey pomelo fiber.

2. The preparation method according to claim 1, wherein in the step (2), the lactic acid bacteria comprise one or more of *Lactobacillus plantarum, Lactobacillus acidophilus, Lactobacillus bulgaricus, Streptococcus thermophilus, Pediococcus pentosaceus* and *Bifidobacterium*.

3. The preparation method according to claim 1, wherein in the step (2), the milk solution is fresh milk, pasteurized milk or reconstituted milk made from milk powder.

4. The preparation method according to claim 1, wherein in the step (4), the honey pomelo fiber pieces are vacuum freeze-dried to a moisture content in dairy products of lower than 10% wt.

5. The preparation method according to claim 1, wherein in the step (1), the peels of honey pomelos are debitterized by hot water blanching, alcohol extraction or enzyme hydrolysis.

* * * * *